Jan. 29, 1952    R. S. GAUGLER    2,583,769
ABSORBER FOR REFRIGERATING APPARATUS
Filed Nov. 26, 1946
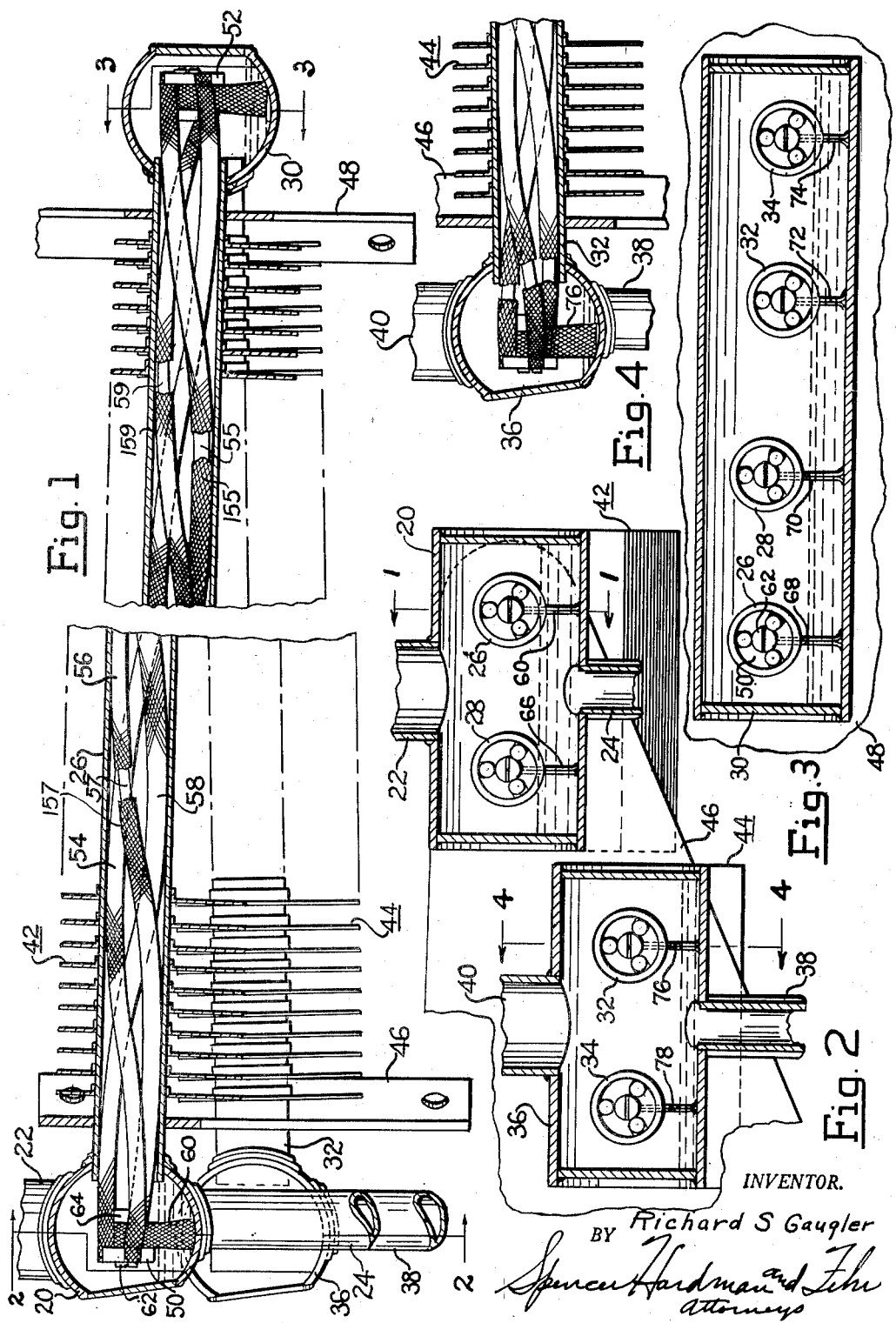
INVENTOR.
BY Richard S Gaugler
Spencer Hardman and Fihu
Attorneys Patented Jan. 29, 1952

2,583,769

UNITED STATES PATENT OFFICE 2,583,769

ABSORBER FOR REFRIGERATING APPARATUS

Richard S. Gaugler, Dayton, Ohio, assignor to General Motors Corporation, Dayton, Ohio, a corporation of Delaware Application November 26, 1946, Serial No. 712,387

12 Claims. (Cl. 261—100)

This invention relates to refrigerating apparatus and more particularly to absorbers for absorption refrigeration.

The greatest difficulty in building an efficient absorption refrigerating apparatus is encountered in building an efficient absorber.

It is an object of my invention to provide an absorber which will surpass all others in efficiency and yet be more simple and less expensive.

It is another object of my invention to provide an absorber in which a simple inexpensive structure is provided for the flow of liquid from one point to another in a thin exposed film of large area.

To attain these objects I provide the absorber in the form of a plurality of slightly inclined connecting conduits provided with transverse fins. Each of the conduits contains a plurality of spaced parallel wires, each covered with braided wire sleeving to form capillary conduits which carry the absorption liquid on their surfaces. These capillary conduits are each in the form of an elongated coil in which the pitch of the coiling decreases from the gas inlet to the gas outlet. Each of the capillary conduits are held firmly substantially throughout their entire length against the inner wall of the connecting conduits to provide good heat transfer and to prevent the flow of liquid along the bottom of the tube. The absorption liquid is fed substantially uniformly to the capillary conduits at the upper end of the connecting conduits and withdrawn at the lower end by a capillary feed.

Further objects and advantages of the present invention will be apparent from the following description, reference being had to the accompanying drawings, wherein a preferred form of the present invention is clearly shown.

In the drawings:

Fig. 1 is a vertical sectional view taken along the line 1—1 of Fig. 2 of an absorber disclosing one embodiment of my invention;

Fig. 2 is a sectional view taken along line 2—2 of Fig. 1;

Fig. 3 is a sectional view taken along the line 3—3 of Fig. 1; and

Fig. 4 is a sectional view taken along the line 4—4 of Fig. 2.

The absorber forming the subject matter of this invention is intended to be used primarily in an absorption refrigeration system of the partial pressure type which includes water as the absorbent, ammonia as the refrigerant and hydrogen as the pressure equalizing medium. However, it should be understood that the structure may also be used for other types of heat transfer apparatus, such as refrigerant evaporators for extremely low pressure refrigerants where it is desired to present a large amount of surface for evaporation. It would also be possible to use the structure for an evaporator in an absorption refrigerating system.

Referring now more particularly to Fig. 1, there is shown an upper header 20 to the top of which is connected a gas outlet tube 22 and to the bottom of which is connected the weak liquor inlet tube 24. Connecting to one side of this header are two slightly inclined tubes or conduits 26 and 28. The opposite ends of the tubes 26 and 28 extend into the side of a long header 30. Also extending from this header 30 but at a slightly lower level is a second set of conduits 32 and 34 which extend from this point slightly downwardly to a third header 36 at their opposite ends. Connected to the bottom of this third header is a liquid absorbent outlet tube 38 while at the top there is a gas inlet tube 40. Transverse fins 42 are provided for transferring heat between the tubes 26 and 28 and the surrounding air while transverse fins 44 are provided for transferring heat between the tubes 32 and 34 and the surrounding air. The structure is supported upon the brackets 46 and 48.

According to my invention, in order to expose a very thin film of absorption liquid of very large area which is in good heat transfer with the walls of the tubes 26 and 28, 32 and 34, I have provided the structure shown within the headers and the tubes. This structure has as its main elements capillary conduits which are formed of solid round wire covered with braided wire sleeving. For example, I may use wire .1 inch in diameter and tightly covered with braided wire sleeving formed of wire .008 inch in diameter with one end up. This forms a woven wire mesh over the entire surface of the solid wire core. The absorption liquid adheres by capillary action to the woven wire mesh and the outer surface of the solid wire core.

Each of the tubes preferably contains three of the capillary conduits supported in uniformly spaced relation at each end by conduit spacers such as the conduit spacers 50 and 52 which support the capillary conduits 54, 56 and 58. The capillary conduit 54 is formed of a solid round wire core 55 within a braided wire sleeve 155 as explained in the previous paragraph. Likewise the conduit 56 is formed of a solid round wire core 57 within the sleeve of wire gauze 157. The capillary conduit 58 is formed of solid round wire core 59 within a sleeve of wire gauze 159. The conduit spacers are provided with three notches 120 degrees apart, which support the capillary conduits in spaced relation and also serve to hold them in contact with the inner surface of the walls of the tubes, such as the tube 26, for example. The solid wire core of each of the capillary conduits is comparatively stiff and yet resilient. The capillary conduits are formed into an elongated coil which may be in the form of a helix but preferably it is in the form of a coil in which the pitch is progressively reduced in the direction of the gas flow as the capillary conduits progress from their lower end to their upper end in conformity to the reduction in the volume of the gas as it passes through the absorber. I prefer to provide a greater number of turns in the upper set of tubes 26 and 28 than in the lower set of tubes 32 and 34. For example, the number of turns in the capillary conduits and the tubes 26 and 28 may be about 5½ while the number of turns in the capillary conduits in the tubes 32 and 34 may be about four. Preferably the pitch of the coils of the capillary conduits is reduced at a uniform rate in the direction of gas flow from the lower end of the conduits to the upper. The reduction, however, may be made in steps, if desired. By making the coils slightly larger than the inner diameter of the tubing, the capillary conduits will tightly engage the inner walls of the tube within which they fit, such as the tube 26.

The capillary conduits are provided at their upper ends with capillary feeding devices. These capillary feeding devices, such as, for example, the capillary feeding device 60 in the header 20, consists of a ribbon of woven wire mesh preferably of flat braided wire sleeving of .008" wire with one end up, formed in the shape of a cotter-pin. The circular portion of this capillary feeding device is provided within the interior space between the ends of the three capillary conduits. It is held in place by a bolt 62 which extends through a central hole in the adjacent capillary conduit spacer, such as the spacer 50, and through the aperture formed within the circular portion of the capillary feeding device 60 and is threaded into a nut 64 which may be formed into a triangular shape or notched so that it will fit between the capillary conduits, such as conduits 54 and 56 and 58.

The cool weak absorption liquid, supplied from the interchanger through the conduit 24 to the bottom of the header 20, first wets the capillary feeding devices 60 and 66 which then carry the absorption liquid to the capillary conduits in the tubes 26 and 28. The absorption liquid then wets these capillary conduits and this liquid then flows slowly over the surface of the wire sleeving of these capillary conduits in tubes 26 and 28 from their upper ends to their lower ends. The absorption liquid is drained at the lower ends of these capillary conduits by a second set of capillary feeding devices 68 and 70 which causes the liquid to drain into the header 30. The capillary conduits in the tubes 32 and 34 are fed by the capillary feeding devices 72 and 74. The liquid flows downwardly over the surfaces of the capillary conduits in the tubes 32 and 34 and is drained at the opposite end by the capillary devices 76 and 78 in the header 36 from which the liquid is drained by the tube 38 which connects to the liquid heat exchanger.

Concurrently with the flow of absorption liquid, the rich gas of ammonia and hydrogen, which is fed by the tube 40 to the lower header 36, flows upwardly through the tubes and is directed into a general helical path by the capillary conduits which act in a manner somewhat similar to the rifling in the barrel of a gun to impart a rotary motion to the gas as it travels axially up to the tubing. Each of the interstices of the braided wire sleeving holds a small pool of absorption liquid. The exposed absorption liquid held in these tiny pools in the interstices of the braided wire sleeving absorbs the ammonia from the whirling gaseous mixture to cause the absorption liquid to be enriched at the expense of the ammonia in the circulating gas, so that the circulating gas is stripped of its ammonia and leaves the absorber by the gas tube 22 substantially pure hydrogen.

The ammonia gas has access at any one time only to the top layer of molecules at the surface of the absorption liquid. The structure of wire mesh disturbs this surface film by turbulence so that other molecules are presented. In flowing over the wire mesh from one pool to another, a turbulence is provided in each pool which is sufficient to present other molecules in direct exposure to the gas. It is believed that this particularly efficient form of turbulence of the gas and liquid and the comparatively large surface area and the good heat transfer between the capillary outlets of the walls of the tubing are responsible for the unusual high efficiency of absorption. The efficiency of this absorber under the conditions imposed by this type of system has been found to be greater than any other commercially manufactured absorber and yet is believed to be sufficiently low in cost to be practical for extensive commercial use.

The combination of the wire core with the enclosing braided wire sleeve provides a construction of high capillarity insuring flow along these elements in preference to flow along the bottom of the tubes. The coiling of these capillary conduits together with the solid inner core blocks the flow of absorption liquid along the bottom of the tubes so that this is kept at a minimum and so that liquid is caused to flow over the surfaces of the capillary conduits. If desired, the capillary feed devices 60 may be omitted and the capillary conduits may be wetted and fed by the liquid flowing directly into the tubes.

Although I have shown two tubes in each pass and two passes in my absorber, this number may be reduced to one or increased, as desired to fit the particular requirements of the system.

While the form of embodiment of the invention as herein disclosed, constitutes a preferred form, it is to be understood that other forms might be adopted, as may come within the scope of the claims which follow.

What is claimed is as follows:

1. Refrigerating apparatus including a tube, a plurality of capillary structures having a core of solid wire covered with a capillary material extending substantially in the form of an elongated coil within said tube, spacing means located at a plurality of points on said structures for holding said structures spaced from each other and in contact with the wall of the tubing, an axially located aperture in one of said spacing means, a bolt extending through said aperture, a capillary member held by said bolt in contact with each of said structures, said capillary member having a portion extending from said bolt, and means forming a pool of liquid receiving said extending portion of said capillary member.

2. Refrigerating apparatus including a tube, a plurality of capillary structures extending through the tube, spacing means beyond the ends of the tube for holding the structures in contact with the walls of the tube, an axially located aperture in one of the spacing means, a bolt extending through said aperture, said structures including a longitudinally extending capillary portion, a capillary material extending around said bolt and being held in contact with the interior sides of said structure by said bolt, the ends of the capillary material extending downwardly from said bolt, and means for conducting liquid to the ends of said capillary material.

3. An absorber for absorption refrigeration apparatus including a first header, a first set of substantially parallel tubes each having one end connected to said header and extending therefrom slightly downwardly, a second header connected to the other ends of said tubes, a second set of tubes extending slightly downwardly from said second header, a third header connected to the lower ends of said second set of tubes, a continuous capillary structure extending within each of said tubes from one end to the other and protruding into the adjacent header, a separate capillary member provided at each end of each of said capillary structures and extending downwardly substantially to the bottom of the header in which it is located, means for supplying liquid to the first header and withdrawing liquid from the third header, and means for circulating a gas in series through the two sets of tubes.

4. Refrigerating apparatus including a plurality of long small tubes having bare inner walls, a plurality of elongated structures of equal length in each of said tubes, said structures each being less than ⅓ the thickness of the tubes, each of said structures having an outer layer of capillary liquid conducting material for longitudinal flow, said structures being substantially equal in length and thickness and identical in construction, means for holding said structures in symmetrical spaced relation and in contact only with the bare inner walls of the tubes to make possible the free access of fluid to all surfaces of said structures excepting the portion directly in contact with the walls of the tubes and the surface in contact with the holding means, and capillary devices including one feeding group located at a higher level connecting with one end of each of said structures and a second draining group located at a lower level than the feeding group connected with the others ends of said structures, each of said capillary devices extending into contact with all the structures of one tube.

5. An absorber for absorption refrigerating apparatus of the inert gas type including a long small generally horizontal slightly inclined tube to promote gravity liquid flow from the upper to the lower portion therein, a plurality of elongated structures of equal length each having a continuous outer liquid conducting capillary composition extending substantially from the upper end to the lower end within the tube, said composition being capable of holding and conducting absorption liquid under the force of gravity due to the inclination of the tube from the higher end to the lower end, spacing means located adjacent the ends of said structures for holding said structures spaced substantially equidistant from each other and in substantially continuous contact between the spacing means with the walls of the tube, means for feeding weak absorption liquid adjacent to the upper end of each of said structures in amounts just sufficient to keep their outer capillary composition saturated with absorption liquid from one end to the other, and means for flowing an enriched gas mixture into the tube through the spaces between said structures to cause absorption of refrigerant from the gas mixture by the weak absorption liquid.

6. An absorber for absorption refrigerating apparatus of the inert gas type including a long small generally horizontal slightly inclined tube to promote gravity liquid flow from the upper to the lower portion therein, a plurality of elongated structures of equal length each having a continuous liquid conducting outer capillary composition extending substantially from the upper end to the lower end within the tube, said composition being capable of holding and conducting absorption liquid under the force of gravity due to the inclination of the tube from the upper end to the lower end, means providing a pool of absorption liquid beneath said structures, a ribbon of capillary material having its lower end in said pool and extending upwardly into contact with the portion of each of said elongated structures adjacent the upper end of said tube.

7. An absorber for absorption refrigeration apparatus including a first header, a first set of long small substantially parallel tubes each having one end connected to said header and extending therefrom slightly downwardly for gravity liquid flow from the upper to the lower portion therein, a second header connected to the lower ends of said tubes, a set composed of a plurality of continuous elongated liquid conducting capillary structures of equal length extending in uniformly spaced relation within each of said tubes from the upper end to the lower end and protruding into each of said headers, said capillary structures being capable of holding absorption liquid and conducting absorption liquid under the force of gravity due to the inclination of the tube from the upper end to the lower end, a separate capillary member provided at each end of each of said sets of capillary structures and extending downwardly substantially to the bottom of the header in which it is located, and means for supplying absorption liquid to the first header.

8. An absorber for absorption refrigerating apparatus including a long small generally horizontal slightly inclined tube to promote gravity liquid flow from the upper to the lower portion therein, a plurality of self-sustaining elongated liquid conducting capillary members of equal length extending from the upper to the lower end within the tube, said capillary members each including a sleeve of wire gauze, the interior of which is completely filled with a stiff resilient wire whose axis and outer surface are concentric with the sleeve so that the sleeve is prevented from collapsing throughout and its capillarity enhanced throughout by contact with the wire making it capable of holding and carrying absorption liquid under the force of gravity due to the inclination of the tube from the higher end to the lower end, spacing means at opposite ends of said capillary members for holding said members in substantially equidistant spaced relationship in contact with the interior surface of the tube throughout the length of the tube, means for feeding weak absorption liquid to the end portions of said capillary members adjacent the upper end of said tube and for supplying a rich gaseous mixture to one end of said tube.

9. Refrigerating apparatus including a long small generally horizontal conduit having an inlet near one end and an outlet near the other end at a lower elevation than the inlet, a plurality of elongated liquid conducting capillary structures for gravity propelled longitudinal flow paralleling the axis of the structures extending from said inlet down to said outlet within said conduit each substantially in the form of an elongated coil substantially continuously contacting the inner wall of the conduit throughout a major portion thereof, said structures being spaced from each other throughout and being substantially parallel, said structures being formed of a solid wire core having a continuous outer capillary composition throughout its entire surface area capable of conducting liquid in said capillary composition from the inlet to the outlet while it is held by the capillary action, and means for feeding liquid to the portion of said structures nearest the inlet.

10. Refrigerating apparatus including a long small generally horizontal conduit having an inlet near one end and an outlet near the other end at a lower elevation than the inlet, a plurality of elongated liquid conducting capillary structures of equal length for gravity propelled longitudinal flow paralleling the axis of the structures extending from said inlet down to said outlet within said conduit each substantially in the form of an elongated coil substantially continuously contacting the inner wall of the conduit throughout a major portion thereof, said structures being spaced from each other throughout and being substantially parallel, said structures being provided with an outer surface of wire gauze and means continuously contacting the entire interior surface of the gauze from the upper to the lower end thereof to provide maximum capillary attraction throughout the gauze, and means for feeding liquid to said gauze, said gauze being capable of conducting liquid from the inlet to the outlet while it is held by capillary action.

11. Refrigerating apparatus including a plurality of connected long generally horizontal small conduits having an inlet near one end and an outlet near the other end at a lower elevation than the inlet and having bare inner wall surfaces, a plurality of elongated liquid conducting capillary structures of equal length for gravity propelled longitudinal flow paralleling the axis of the structures extending within each of said conduits, each of said structures being in the form of an elongated coil having a pitch greater than its diameter and substantially continuously directly contacting the bare inner wall surfaces of its respective conduit throughout a major portion thereof, said structures being spaced from each other throughout, said structures being formed of a solid wire having its entire surface continuously contacted by and covered with a coaxially arranged tightly enveloping liquid conducting capillary material, and means for feeding liquid to one end of the capillary material in one conduit, and means for transferring the liquid from the other end of the capillary material in said one conduit to an end of the capillary material of the structure in another conduit.

12. Refrigerating apparatus including a long generally horizontal slightly inclined tube having bare inner wall surfaces, a plurality of elongated liquid conducting capillary structures of equal length for gravity propelled longitudinal flow parallel to the axis of the structures, said structures being provided with a core of solid wire having its entire surface continuously contacted by and covered with a coaxially arranged tightly enveloping liquid conducting capillary material extending within said tube substantially in the form of an elongated coil having a pitch greater than the diameter of its coils, said capillary material being capable of conducting liquid by gravity flow from the upper end of the tube to the lower end, spacing means located at a plurality of points on said structures for holding said structures spaced from each other and in contact with the bare inner wall surfaces of the tubing, and means for feeding a liquid to said structures.

RICHARD S. GAUGLER.

REFERENCES CITED

The following references are of record in the file of this patent:

UNITED STATES PATENTS

| Number | Name | Date |
|---|---|---|
| 1,790,993 | Matteson | Feb. 3, 1931 |
| 1,879,358 | Lilly | Sept. 27, 1932 |
| 1,983,295 | Kohler | Dec. 4, 1934 |
| 2,210,031 | Green | Aug. 6, 1940 |
| 2,317,101 | Lecky | Apr. 20, 1943 |
| 2,332,110 | Podbielniak | Oct. 19, 1943 |

FOREIGN PATENTS

| Number | Country | Date |
|---|---|---|
| 8,617 | Great Britain | Apr. 16, 1903 |
| 661,752 | Germany | June 25, 1938 |